United States Patent
Park et al.

(10) Patent No.: US 9,893,661 B2
(45) Date of Patent: Feb. 13, 2018

(54) ANTI-JERK CONTROL APPARATUS AND METHOD FOR HYBRID ELECTRIC VEHICLE

(71) Applicants: Hyundai Motor Company, Seoul (KR); Kia Motors Corporation, Seoul (KR)

(72) Inventors: Tae Wook Park, Seoul (KR); Joon Young Park, Seoul (KR); Tae Hoon Lee, Gyeonggi-Do (KR); Hyung Bin Ihm, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 195 days.

(21) Appl. No.: 14/663,973

(22) Filed: Mar. 20, 2015

(65) Prior Publication Data

US 2015/0263657 A1 Sep. 17, 2015

Related U.S. Application Data

(62) Division of application No. 12/894,368, filed on Sep. 30, 2010, now Pat. No. 9,008,941.

(30) Foreign Application Priority Data

Nov. 6, 2009 (KR) .................. 10-2009-0106707

(51) Int. Cl.
  *B60K 6/26* (2007.10)
  *B60W 30/20* (2006.01)
  (Continued)

(52) U.S. Cl.
  CPC ............ *H02P 7/2855* (2013.01); *B60K 6/448* (2013.01); *B60L 11/14* (2013.01); *B60W 10/06* (2013.01);
  (Continued)

(58) Field of Classification Search
  USPC .......................................................... 701/22
  See application file for complete search history.

(56) References Cited

U.S. PATENT DOCUMENTS 5,020,491 A * 6/1991 Mashino ................. F02B 75/06
  123/179.1
5,452,698 A * 9/1995 Denz ..................... F02P 5/1455
  123/406.24
(Continued)

FOREIGN PATENT DOCUMENTS

CN  101400535 A  4/2009
JP  2000-069607 A  3/2000
(Continued)

OTHER PUBLICATIONS

Office Action from corresponding Korean Application No. 2011-0049934.

*Primary Examiner* — Shelley Chen
(74) *Attorney, Agent, or Firm* — Mintz Levin Cohn Ferris Glovsky and Popeo, P.C.; Peter F. Corless

(57) ABSTRACT

The present invention relates to an anti-jerk control apparatus and method for an Hybrid Electric Vehicle (HEV).
The anti-jerk control apparatus includes a model speed calculation unit for calculating a model speed of the motor in a state in which a vibration of a drive shaft is not considered. A vibration occurrence determination unit detects a speed vibration component while calculating a reference speed difference and an average speed difference from differences between the model speed and an actual speed of the motor, thus determining whether a vibration occurs on the drive shaft. A torque correction value calculation unit calculates a motor torque correction value for anti-jerk required to damp the vibration of the drive shaft, (Continued)

and controls torque of the motor if the vibration occurrence determination unit determines that the vibration occurs on the drive shaft.

3 Claims, 4 Drawing Sheets

(51) Int. Cl.
| | |
|---|---|
| H02P 7/285 | (2016.01) |
| B60W 40/105 | (2012.01) |
| B60W 10/06 | (2006.01) |
| B60K 6/448 | (2007.10) |
| B60L 11/14 | (2006.01) |
| B60W 30/19 | (2012.01) |
| H02P 6/10 | (2006.01) |
| B60W 10/08 | (2006.01) |
| B60W 20/00 | (2016.01) |
| B60W 50/00 | (2006.01) |

(52) U.S. Cl.
CPC ............ *B60W 30/19* (2013.01); *B60W 30/20* (2013.01); *B60W 40/105* (2013.01); *H02P 6/10* (2013.01); *B60K 6/26* (2013.01); *B60L 2270/145* (2013.01); *B60W 10/08* (2013.01); *B60W 20/00* (2013.01); *B60W 2050/0037* (2013.01); *B60W 2710/083* (2013.01); *Y02T 10/6243* (2013.01); *Y02T 10/70* (2013.01); *Y02T 10/7077* (2013.01); *Y02T 10/7258* (2013.01); *Y10S 903/906* (2013.01)

(56) References Cited

U.S. PATENT DOCUMENTS

| | | | | |
|---|---|---|---|---|
| 7,190,134 | B2* | 3/2007 | Shibata | ................... H02P 29/50 318/400.23 |
| 7,975,791 | B2* | 7/2011 | Nozaki | .................... B60K 6/48 180/65.21 |
| 2002/0190683 | A1* | 12/2002 | Karikomi | ............... G01M 3/005 318/568.11 |
| 2007/0046226 | A1* | 3/2007 | Takahashi | ............ H02H 7/0851 318/268 |
| 2007/0114082 | A1* | 5/2007 | Nozaki | .................... B60K 6/48 180/65.6 |
| 2009/0037060 | A1* | 2/2009 | Carlhammar | .......... B60K 6/387 701/54 |

FOREIGN PATENT DOCUMENTS

| | | | | |
|---|---|---|---|---|
| JP | 2002138876 | A | | 5/2002 |
| JP | 2002262408 | A | | 9/2002 |
| JP | 2003009566 | A | * | 1/2003 ............. G05D 19/02 |
| JP | 2004076592 | A | | 3/2004 |
| JP | 2006017042 | A | | 1/2006 |
| JP | 2008162315 | A | | 7/2008 |
| KR | 10-2006-0052657 | | | 5/2006 |
| KR | 10-2009-0062871 | | | 6/2009 |
| KR | 10-2009-0071298 | | | 7/2009 |

* cited by examiner

ANTI-JERK CONTROL APPARATUS AND METHOD FOR HYBRID ELECTRIC VEHICLE

CROSS-REFERENCE TO RELATED APPLICATIONS

This application is a divisional of U.S. patent application Ser. No. 12/894,368 filed in the United States Patent and Trademark Office on Sep. 30, 2010, which claims under 35 U.S.C. § 119(a) the benefit of Korean Patent Application No. 10-2009-0106707 filed Nov. 6, 2009, the entire contents of which are incorporated herein by reference

BACKGROUND (a) Technical Field

The present disclosure relates generally to an anti-jerk control apparatus and method for a Hybrid Electric Vehicle (HEV). More particularly, the present invention relates to an anti-jerk control apparatus and method for an HEV, which can prevent vibrations from occurring on a drive shaft at the time of changing gears and performing a tip-in/out, as well as at the time of releasing the clutch, by using the torque control of a motor.

(b) Background Art

A Hybrid Electric Vehicle (HEV) employs a motor driving source as an auxiliary power source, in addition to an engine, and thus can reduce waste gas and improve fuel economy. The construction of a driving system (power train system) for a parallel HEV is described below. As shown in the block diagram of FIG. 4, the power train system is configured such that an engine 10, a motor 20 and an automatic transmission 30 are suitably disposed in a col-linear fashion on a drive shaft 90, and such that a clutch 40 is suitably disposed between the engine 10 and the motor 20. Further, as components for operating the above components, a Hybrid Starter Generator (HSG) 70 is suitably connected to the crank pulley of the engine by a belt, and a high-voltage battery 50 is chargeably or dischargeably connected both to the motor 20 and to the HSG 70 through an inverter 60.

Further, a scheme using a Transmission Mounted Electric Device (TMED) in which an electric motor is assembled to an automatic transmission has been used.

The driving modes of a hybrid electric vehicle based on the above construction include an Electric Vehicle (EV) mode, that is, a pure electric vehicle mode in which only the power of a motor is used, an HEV mode in which the motor is used as an auxiliary power source while the engine is used as a main power source, and a Regenerative Braking (RB) mode in which the motor recovers braking and inertial energy of a vehicle by the generation of power and recharges the battery with the energy while the vehicle is braking, or being driven under inertia.

In such an HEV, since the engine is suitably coupled to the automatic transmission using a clutch instead of a torque converter, there is a disadvantage in that the passive damping effect of a conventional torque converter cannot be suitably obtained.

Since a separate damping means is excluded in this way, vibrations such as shock and jerk (instantaneous, sudden movement), together with the vibration of a drive shaft, occur at the time of changing gears, performing a tip-in/out (operation of pressing or releasing an accelerator pedal), and engaging the clutch, thus deteriorating riding comfort and drivability.

Further, both the automatic transmission 30, suitably disposed between the motor 20 and a driving wheel 80, and a final reduction gear (not shown), connected to the output shaft of the automatic transmission 30, have gear elements having backlash characteristics, but they lack damping elements such as torsional dampers. Accordingly, when the direction of effective transfer torque is changed, a vibration attributable to backlash occurs.

Therefore, in an effort to damp such a vibration, various methods, such as a passive damping method, a closed-loop controlled active damping method and an open-loop controlled torque profiling method, have been used. The passive damping method is a method of additionally and separately mounting a physical damping element such as a physical torsional damper. The closed-loop controlled active damping method is a method of enabling a damping force to be actuated in the reverse direction of vibration. The open-loop controlled torque profiling method is a method of canceling exciting components on the basis of a vibration mechanism.

However, in the passive damping method, a physical damper must be additionally mounted on a driving system, and it is difficult to cope with the problem of packaging and design caused by the addition of the damper. Further, the active damping method requires the design of a high-performance sensor and a high-performance observer. Furthermore, in the torque profiling method, various types of torque modifications are taken into consideration, and thus it is difficult to obtain complete vibration damping performance.

In order to prevent a vibration (jerk) from occurring during the engagement of the clutch between the engine and the automatic transmission, anti-jerk control for increasing engine torque has been performed by an engine controller (Engine Management System: EMS). However, since the engine is disconnected from the drive shaft when the clutch is released, the anti-jerk control cannot be performed, thus making it impossible to suppress jerk components caused by the release of the clutch.

Japanese Patent Laid-Open Publication No. 2002-262408, incorporated by reference in its entirety herein, discloses a technology in which torque correction values are set based on an inertial relationship between an engine and a motor, and in which, when a difference in the rotation speed between the engine and the motor occurs, the torque of the motor is suitably corrected by using a predetermined torque correction value corresponding to the difference in the rotation speed. Further, Korean Patent Publication No. 2009-62871, incorporated by reference in its entirety herein, discloses a technology in which, when a clutch release command is given, driving control is suitably performed in an EV mode, thus preventing a shock phenomenon. However, even if the above technologies are applied, forward torque (+) is input by the engine, and thus a jerk phenomenon attributable to the engagement/release of the clutch cannot be fundamentally blocked.

Accordingly, there remains a need in the art for an anti-jerk control apparatus and method for an HEV.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention preferably provides an anti-jerk control apparatus and method for an HEV, which suitably determines whether a vibration occurs by using the difference between the actual speed of a motor and the model speed of the motor obtained in a jerk-free state, and causes the difference between the actual speed and the model speed of the motor to be 0 by controlling the correction of the torque of the motor, which enables the input of both forward torque (+) and reverse torque (−), thus preventing vibrations (jerks) from occurring on a drive shaft even at the time of changing gears and performing a tip-in/out, as well as at the time of releasing a clutch.

In a preferred embodiment, the present invention provides an anti-jerk control apparatus for a Hybrid Electric Vehicle (HEV) in which an engine, a motor and an automatic transmission are suitably disposed in a collinear fashion on one shaft and a clutch is suitably disposed between the engine and the motor, comprising a model speed calculation unit for calculating a model speed of the motor in a state in which a vibration of a drive shaft is not considered; a vibration occurrence determination unit for detecting a speed vibration component while calculating a reference speed difference and an average speed difference from differences between the model speed and an actual speed of the motor, thus determining whether a vibration occurs on the drive shaft; and a torque correction value calculation unit for, if the vibration occurrence determination unit determines that the vibration occurs on the drive shaft, calculating a motor torque correction value for anti-jerk required to damp the vibration of the drive shaft, and controlling torque of the motor.

In a preferred embodiment, the torque correction value calculation unit suitably controls the torque of the motor using negative feedback control so that the difference between the model speed and the actual speed of the motor becomes 0.

In another preferred embodiment, the present invention provides an anti-jerk control method for a Hybrid Electric Vehicle (HEV), comprising calculating a model speed of a motor in a state in which a vibration of a drive shaft is not considered; calculating an actual speed of the motor; obtaining differences between the model speed and the actual speed of the motor, thus calculating a reference speed difference and an average speed difference; comparing the reference speed difference with the average speed difference, and determining that a vibration of the drive shaft has occurred when a speed vibration component, obtained when the reference speed difference is greater or less than the average speed difference, is suitably detected; determining a motor torque correction value for anti-jerk required to damp the vibration of the drive shaft; and controlling torque of the motor using negative feedback control allowing the motor torque correction value for anti-jerk to be applied so that the difference between the model speed and the actual speed of the motor becomes 0.

In a preferred embodiment, the motor torque correction value for anti-jerk is determined by an equation of [torque correction value=gain*((model speed−actual speed)−average speed difference)].

In another preferred embodiment, the gain is set to different values for cases requiring anti-jerk control, such as clutch releasing, gear changing, tip-in/out, and braking.

As described above, the present invention provides the following effects.

According to preferred embodiments of the present invention, whether a vibration occurs is suitably determined by using the difference between the actual speed of a motor and the model speed of the motor obtained in a jerk-free state, and thereafter the difference between the actual speed and the model speed of the motor is caused to be 0 by controlling the correction of the torque of the motor. Accordingly, vibrations can be suitably prevented from occurring on a drive shaft even at the time of changing gears and performing a tip-in/out, as well as at the time of releasing a clutch. Thus, the driving performance and riding comfort of a hybrid electric vehicle can be suitably improved.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
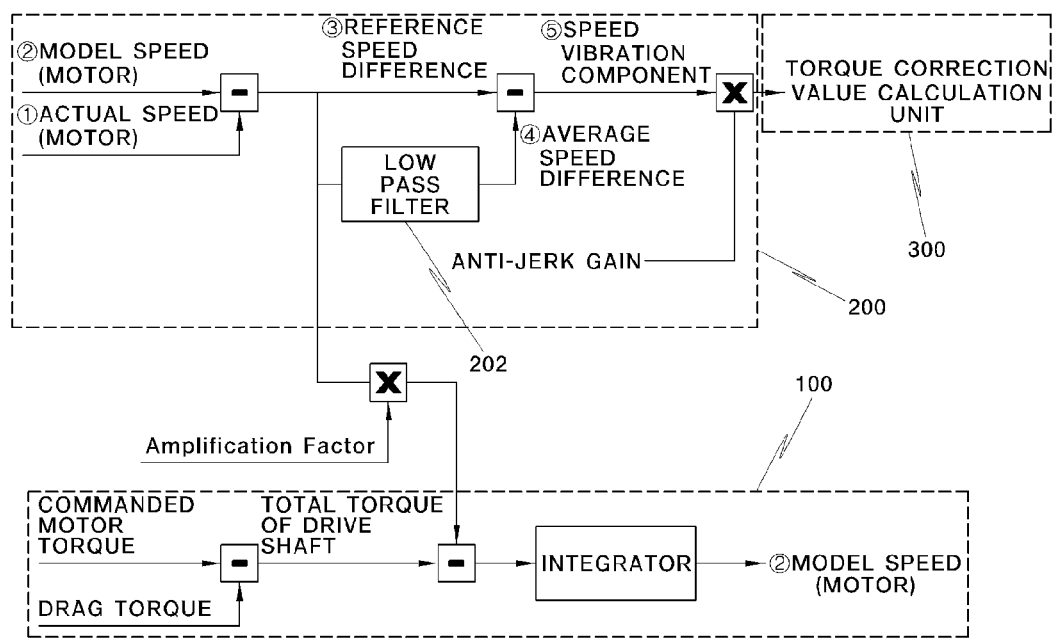
FIG. 1 is a control diagram showing an exemplary anti-jerk control apparatus for an HEV according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features an anti-jerk control apparatus for a Hybrid Electric Vehicle (HEV) in which an engine, a motor and an automatic transmission are disposed in a collinear fashion on one shaft and a clutch is disposed between the engine and the motor, comprising a model speed calculation unit for calculating a model speed of the motor in a state in which a vibration of a drive shaft is not considered, a vibration occurrence determination unit, and a torque correction value calculation unit.

In one embodiment, the vibration occurrence determination unit is used for detecting a speed vibration component while calculating a reference speed difference and an average speed difference from differences between the model speed and an actual speed of the motor, thus determining whether a vibration occurs on the drive shaft.

In another embodiment, the vibration occurrence determination unit determines that the vibration occurs on the drive shaft, the torque correction value calculation unit calculates a motor torque correction value for anti-jerk required to damp the vibration of the drive shaft, and controls the torque of the motor.

In another aspect, the present invention also features an anti-jerk control method for a Hybrid Electric Vehicle (HEV), comprising calculating a model speed of a motor in a state in which a vibration of a drive shaft is not considered, calculating an actual speed of the motor, obtaining differences between the model speed and the actual speed of the motor, thus calculating a reference speed difference and an average speed difference, comparing the reference speed difference with the average speed difference, and determining that a vibration of the drive shaft has occurred when a speed vibration component, obtained when the reference speed difference is greater or less than the average speed difference, is detected, determining a motor torque correction value for anti-jerk required to damp the vibration of the drive shaft, and controlling torque of the motor using negative feedback control allowing the motor torque correction value for anti-jerk to be applied so that the difference between the model speed and the actual speed of the motor becomes 0.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with the attached drawings.

Figure 2A:
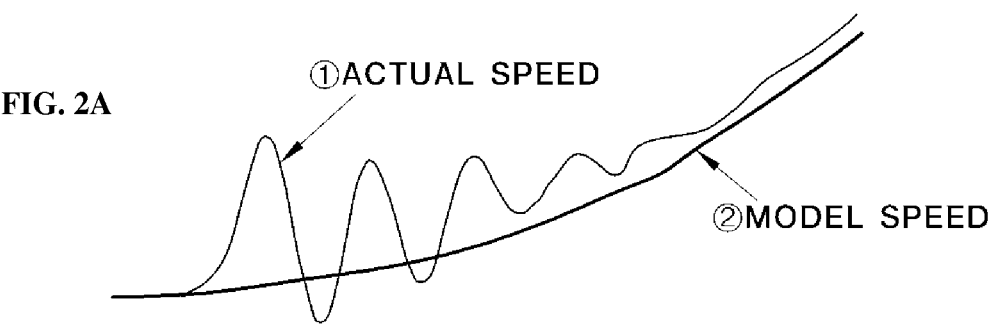
FIGS. 2A to 2C are graphs showing an exemplary anti-jerk control operation for an HEV according to the present invention.
Figure 2B:
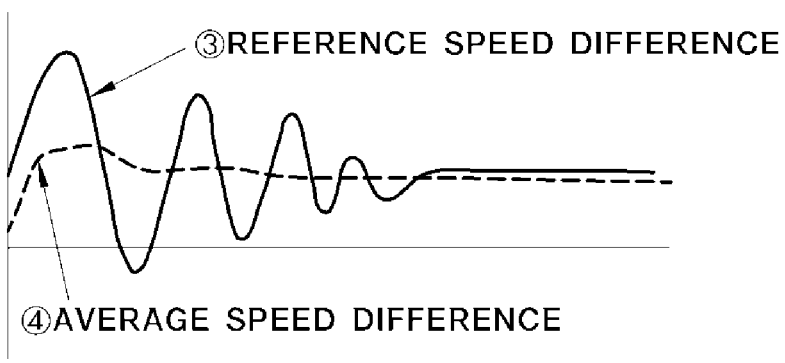
Figure 2C:
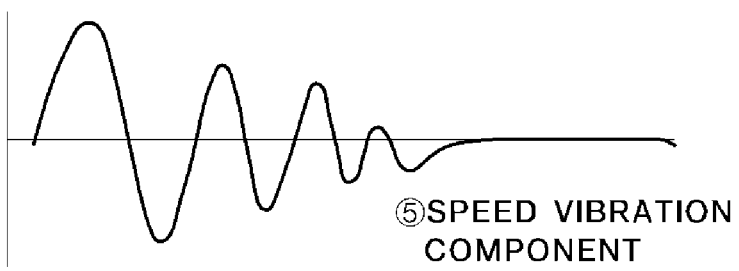
Figure 3:
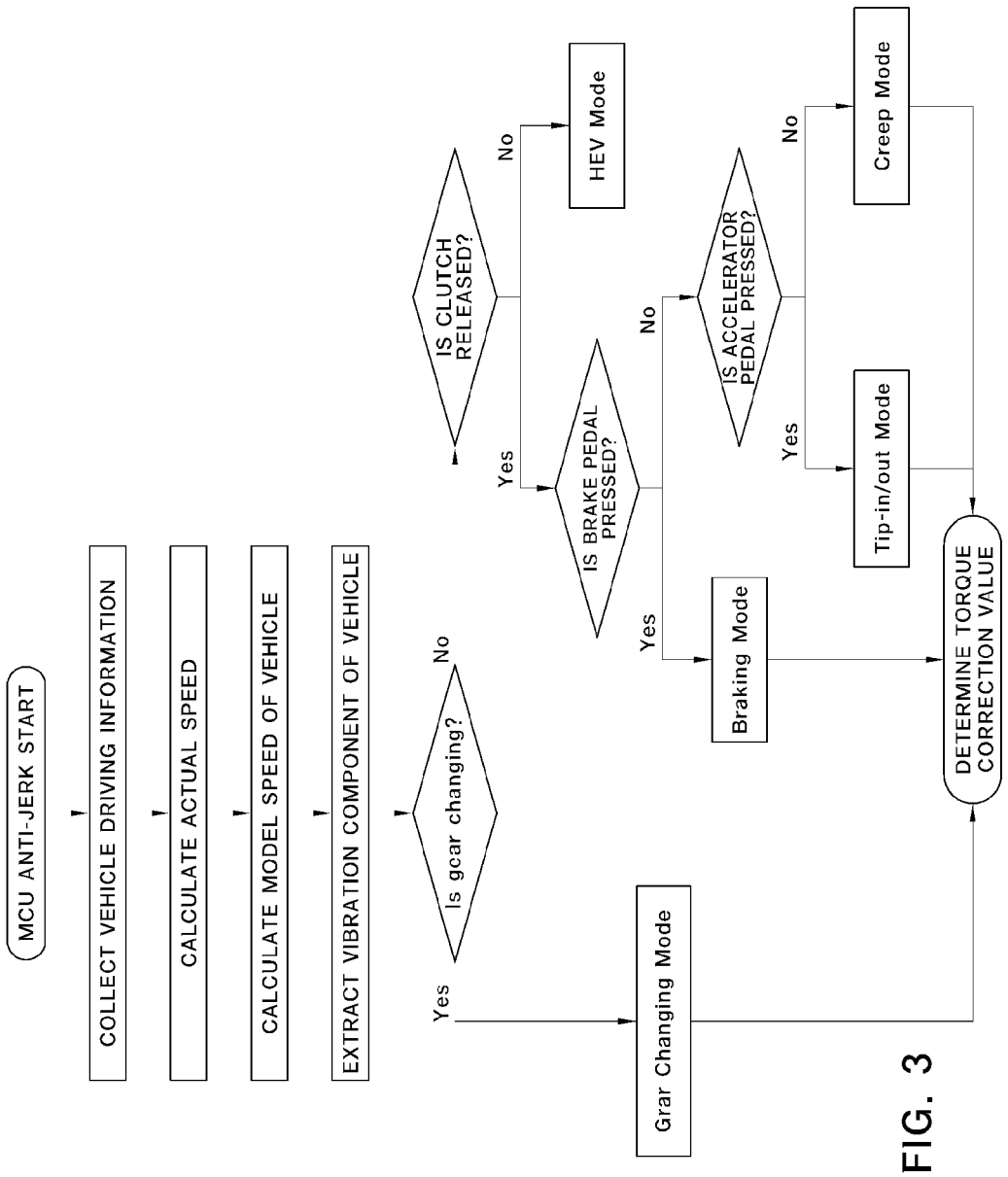
FIG. 3 is a flowchart showing an exemplary anti-jerk control method for an HEV according to the present invention.
Figure 4:
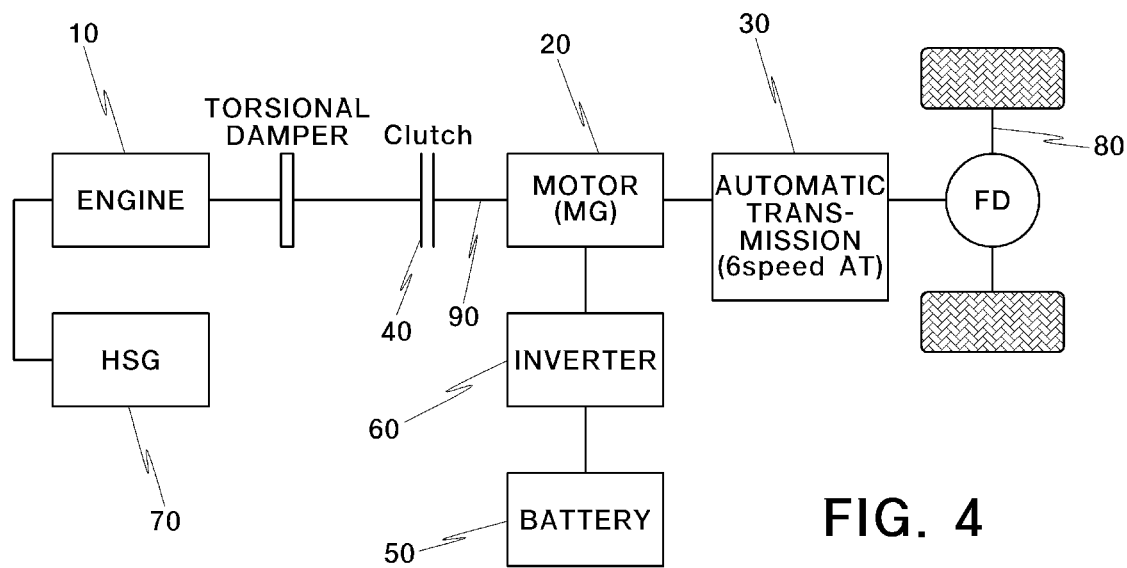
FIG. 4 is a diagram showing an exemplary power train system for an HEV.

According to certain preferred embodiments, and as shown in FIGS. 1-3, for example, FIG. 1 is a control diagram showing an anti-jerk control apparatus for a Hybrid Electric Vehicle (HEV) according to a preferred embodiment of the present invention, FIGS. 2A to 2C are graphs showing an anti-jerk control operation for an HEV according to another preferred embodiment of the present invention, and FIG. 3 is a flowchart showing an anti-jerk control method for an HEV according to another preferred embodiment of the present invention.

Preferably, anti-jerk control for an HEV according to the present invention is performed by a Motor Control Unit (MCU) and is suitably configured to perform control such that vibrations (jerks) are prevented from occurring on a drive shaft under various conditions such as a tip-in/out operation during the driving of the vehicle or a creep driving operation (refers to a driving operation when the vehicle is slowly moving after stopping in an EV mode) in an EV mode, and a gear changing operation or a clutch releasing operation in an HEV mode.

According to preferred embodiments, for these operations, a model speed, which is the speed of the motor in the state in which vibration (jerk) of a drive shaft is not considered (a jerk-free state), is suitably calculated by a model speed calculation unit 100. Preferably, this model speed is calculated by subtracting drag torque from commanded motor torque, subtracting the total torque of the drive shaft from resulting torque, and integrating final resulting torque.

Preferably, when the HEV is driving, a vibration phenomenon such as a shock & jerk occurs together with the vibration of the drive shaft, and thus the actual speed of the motor that may preferably include a vibration component is calculated.

In another further preferred embodiment, the vibration occurrence determination unit 200 of the motor control unit calculates the differences between the model speed of the motor and the actual speed of the motor in real time, and suitably calculates the average speed difference thereof while setting a reference speed difference on the basis of the speed differences.

Accordingly, when a predetermined difference between the model speed and the actual speed of the motor is suitably obtained, the difference is set to the reference speed difference. Preferably, the speed differences are filtered by a Low Pass Filter (LPF) 202, and thus the average speed difference is suitably obtained.

Preferably, when the average speed difference is suitably obtained while the reference speed difference is set, the reference speed difference is compared with the average speed difference, as shown in FIG. 2B, and thus a speed vibration component is suitably detected.

According to preferred exemplary embodiments, for example as shown in detail in FIG. 2C, the reference speed difference is compared with the average speed difference. Preferably, when the reference speed difference is greater or less than the average speed difference, a vibration component proportional to the difference therebetween is suitably detected as the speed vibration component.

According to preferred exemplary embodiments, when the speed vibration component is detected in this way, the vibration occurrence determination unit 200 determines that a vibration has occurred on the drive shaft, and thus a torque correction value calculation unit 300 calculates a motor torque correction value for anti-jerk.

In other words, when the vibration occurrence determination unit 200 suitably determines that the vibration has occurred on the drive shaft, the torque correction value calculation unit 300 calculates the motor torque correction value for anti-jerk required to damp the vibration of the drive shaft, and suitably controls the torque of the motor to damp the vibration of the drive shaft.

Accordingly, in further preferred embodiments, after the speed vibration component has been suitably detected, the vibration of the drive shaft mainly occurs in various conditional modes such as a gear changing mode in which gears are changed, a braking mode in which a brake pedal is pressed after the clutch is released, a tip-in/out mode in which an accelerator pedal is repeatedly pressed or released after the clutch is released, and a creep mode in which low-speed driving is suitably performed using only the driving force of the motor while the accelerator pedal is not pressed after the clutch is released, as shown in FIG. 3. Accordingly, the motor torque correction value for anti-jerk required to damp the vibration of the drive shaft is calculated, so that the torque of the motor is suitably controlled to damp the vibration of the drive shaft.

In certain preferred exemplary embodiments, the motor torque correction value for anti-jerk is suitably determined by an equation of [gain*((model speed−actual speed)−average speed difference)], and the gain is previously set to different values for various cases requiring anti-jerk control, such as clutch releasing, gear changing, tip-in/out, and braking.

Accordingly, the torque correction value calculation unit 300 controls the torque of the motor using negative feedback control so that the difference between the model speed and the actual speed of the motor becomes 0.

Accordingly, in certain preferred embodiments, the motor torque is suitably controlled by means of negative feedback control allowing the determined motor torque correction value for anti-jerk to be applied to the torque correction value calculation unit 300 until the difference between the model speed and the actual speed of the motor becomes 0, thus easily preventing vibrations (jerks) from occurring on the drive shaft under various conditions such as a gear changing operation and a tip-in/out operation, as well as a clutch releasing operation.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An anti-jerk control method for a Hybrid Electric Vehicle (HEV), comprising:
    calculating a model speed of a motor in a state in which a vibration of a drive shaft is not considered;
    calculating an actual speed of the motor;
    obtaining differences between the model speed and the actual speed of the motor, thus calculating a reference speed difference and an average speed difference;
    comparing the reference speed difference with the average speed difference, and determining that a vibration of the drive shaft has occurred when a speed vibration component, obtained when the reference speed difference is greater or less than the average speed difference, is detected;
    determining a motor torque correction value for anti-jerk required to damp the vibration of the drive shaft; and
    controlling torque of the motor using negative feedback control allowing the motor torque correction value for anti-jerk to be applied so that the difference between the model speed and the actual speed of the motor becomes 0.

2. The anti-jerk control method of claim 1, wherein the motor torque correction value for anti-jerk is determined by an equation of [torque correction value=gain*((model speed−actual speed)−average speed difference)].

3. The anti-jerk control method of claim 2, wherein the gain is set to different values for cases requiring anti-jerk control, such as clutch releasing, gear changing, tip-in/out, and braking.

* * * * *